United States Patent [19]
Kanamori et al.

[11] Patent Number: 5,737,199
[45] Date of Patent: Apr. 7, 1998

[54] FAIL CHECK DEVICE AND METHOD FOR SWITCHING SIGNAL LINES

[75] Inventors: Akihiko Kanamori, Okazaki; Shinji Kogure, Toyota, both of Japan

[73] Assignee: Toyota Jidosha Kabushiki Kaisha, Toyota, Japan

[21] Appl. No.: 677,836

[22] Filed: Jul. 10, 1996

[30] Foreign Application Priority Data

Aug. 31, 1995 [JP] Japan ................. 7-223431

[51] Int. Cl.[6] ........................ H02H 7/122
[52] U.S. Cl. ............ 363/56; 322/28; 324/416; 324/511; 324/503; 361/23
[58] Field of Search ............ 363/56, 98, 132, 363/41; 322/28, 37; 324/416, 511, 503

[56] References Cited

FOREIGN PATENT DOCUMENTS

| | | |
|---|---|---|
| 61-15521 | 1/1986 | Japan . |
| 63-146488 | 9/1988 | Japan . |
| 1-131298 | 9/1989 | Japan . |

*Primary Examiner*—Peter S. Wong
*Assistant Examiner*—Shawn Riley
*Attorney, Agent, or Firm*—Oblon, Spivak, McClelland, Maier, & Neustadt, P.C.

[57] ABSTRACT

A fail check device and method for switching signal lines, wherein PWM signals are sent out onto PWM signal lines through a PWM signal output/survey circuit. Based on the level of the PWM signals to be sent out and the level of the PWM signals actually sent out, a PWM mismatch signal (logical) is produced. The produced PWM mismatch signal (logical) has a value which indicates a fault when the PWM signal lines are in a state of breakage or short circuit to a ground or the PWM signal lines in a predrive circuit are short-circuited to the positive wiring of a power source. Therefore, by using the PWM mismatch signal (logical), a breakage in the PWM signal lines or a fault in the predrive circuit can be detected by a control CPU.

4 Claims, 3 Drawing Sheets

FAIL CHECK DEVICE AND METHOD FOR SWITCHING SIGNAL LINES

BACKGROUND OF THE INVENTION a) Field of the Invention

The invention relates to a fail check device and method for switching signal lines, and more particularly to a device and method for detecting a fault or the possibility of a fault occurrence in switching signal lines which supply switching signals to switching elements or in circuits connected to the switching signal lines.

b) Description of the Related Art

Conversion of electric power from dc to ac can be achieved by supplying switching signals to respective switching elements constituting an inverter such as a PWM inverter which uses PWM (pulse width modulated) signals as the switching signals. To properly convert electric power using the PWM inverter, the PWM signals must be supplied to respective switching elements without failure.

The device (hereinafter referred to as the "conventional device") disclosed in Japanese Utility Model Laid-Open Publication No. Sho 63-146488 has means for detecting the frequency of PWM signals supplied from a controller to the PWM inverter and means for comparing the detected frequency of the PWM signals with a reference signal for commanding the frequency of the PWM signals. In this way, a judgement is made as to whether or not the frequency of the PWM signals being supplied to the PWM inverter is normal or abnormal. More specifically, the conventional device has a signal line from the controller branched into at least two signal lines; one signal line (first signal line is connected) is connected to the PWM inverter, and the other signal line (second signal line) to a frequency comparator. The first signal line is used as a PWM signal line for supplying the PWM signals from the controller to the PWM inverter, and the second signal line is used as a detection signal line for detecting the frequency failure of the PWM signals with the frequency comparator.

This conventional device is useful for monitoring the frequency of PWM signals and maintaining them at normal values, but also has some disadvantages. One of the disadvantages of the conventional device is that, since the signal line is branched in order to detect the frequency of PWM signals, a fault (e.g., breakage) occurring at the forward part of the branched point of the signal line (i.e. at the first signal line or devices connected thereto) cannot be detected. The above situation causes a disadvantage in that the power conversion by the PWM converter is not carried out as desired, and as a result the respective switching elements configuring the PWM inverter and a load (e.g., a motor) on the inverter may malfunction.

SUMMARY OF THE INVENTION

One object of the invention is to provide means for more reliably detecting a fault which has occurred in switching signal lines for transmitting switching signals such as PWM signals from a controller to a switching circuit such as an inverter or in other members related to the switching signal lines. The invention achieves this object by providing improved fail check logic which operates when the switching signals are supplied to the switching circuit.

A basic embodiment of the invention relates to a fail check device or method for monitoring whether or not a fault related to switching signal lines has occurred, and supplying the switching signals to switching elements through the switching signal lines. The embodiment having means or steps for producing the switching signals and means or steps for applying the switching signals to the switching signal lines. Output signals actually being sent to the switching signal lines are detected in this embodiment. In addition, according to this embodiment, the possibility of occurrence of a fault related to the switching signal lines is detected based on the detected output signals and the switching signals applied (strictly speaking, that should have been applied) to the switching signal lines. Thus, since the output signals actually sent to the switching signal lines are collated not with a signal which commands the frequencies of the switching signals, but with the switching signals themselves, the possibility of occurrence of a fault related to the switching signal lines can be detected with high reliability, and such a fault can be detected regardless of where it has occurred in the switching signal lines.

In a more complex embodiment of the invention, when the above fault possibility is detected, both on and off periods of the switching signals are forcedly set to a prescribed duration or longer, and the above-described fault possibility is detected for the on period and the off period, respectively. Therefore, the operation to detect the possibility of a fault can be carried out with certainty, for the on and off period, respectively. Thus, compared with the above-described basic embodiment, the occurrence of a fault in the switching signal lines can be checked with higher accuracy, and a false check result can be prevented.

According to another embodiment of the invention, when the above fault possibility is continuous for a prescribed duration or longer, it is determined that there definitely is a fault in the switching signal lines. Since a false check result of the possibility of a fault in the switching signal lines due to effects such as a switching rate and noise can be prevented, this embodiment can check for a fault in the switching signal lines with higher accuracy than in the above-described basic embodiment.

According to still another embodiment of the invention, when a fault or a possibility of a fault is checked, an emergency stopping signal is supplied through an emergency stopping signal line independent of the switching signal lines to forcedly terminate the operations of the switching elements. Therefore, since switching elements are stopped from operating when a fault or a possibility of a fault is detected, the switching elements and a device such as a motor which is a load on the switching elements are not influenced by the fault in the switching signal lines.

DETAILED DESCRIPTION OF THE PREFERRED EMBODIMENTS

Preferred embodiments of the invention will be described with reference to the accompanying drawings.

Figure 1:
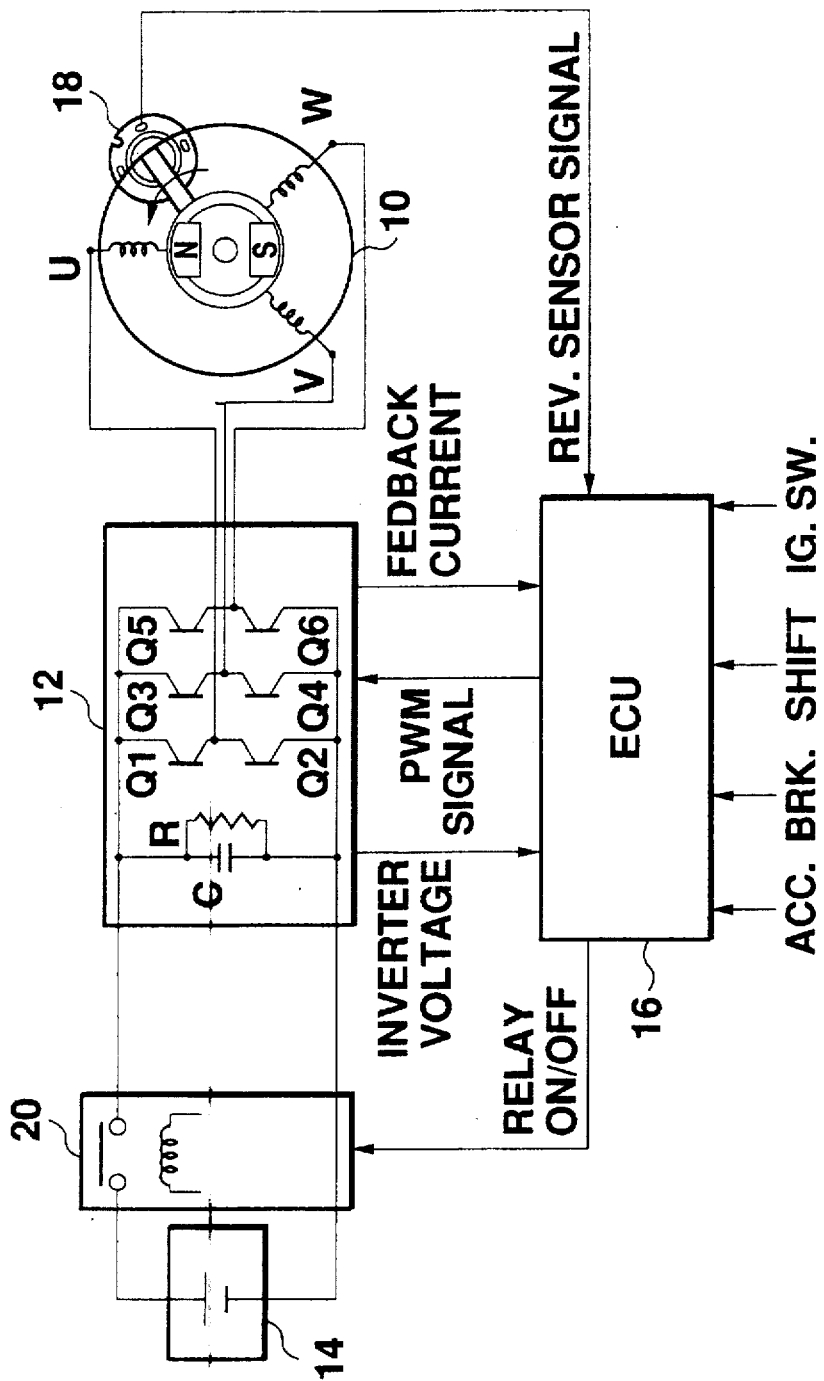
FIG. 1 is a block diagram showing the system configuration of an electric vehicle according to the present invention.

FIG. 1 shows the system configuration of an electric vehicle according to one embodiment of the invention. The electric vehicle shown in this drawing is equipped with a three-phase ac motor excited by permanent magnets, and used as a train motor 10 for driving the electric vehicle. Phase windings U, V and W of the motor 10 are supplied with a drive current from a battery 14 through an inverter 12 which includes switching elements Q1 through Q6 such as IGBTs (Insulated Gate Bipolar Transistors) corresponding to respective U, V and W windings of the motor 10. A capacitor C for smoothing a voltage supplied from the battery 14, and a resistor R for discharging the capacitor C are also provided.

After an ignition (IG) switch is turned on, an ECU (Electronic Control Unit) 16 produces the PWM signals according to an accelerator signal, a brake signal or a shift position signal and based on an angular position of the rotor of the motor 10 detected by a rotor position sensor 18, thereby controlling the respective switching elements constituting the inverter 12. Prior to the operation of the inverter 12, the ECU 16 controls a relay unit 20 which is provided between the battery 14 and the inverter 12 so as to connect the battery 14 and the inverter 12. The ECU 16 receives an input voltage (inverter voltage) from the inverter 12 as necessary, and detects currents respectively flowing in the U, V and W windings of the motor 10 and inputs the current via a feedback current path.

Figure 2:
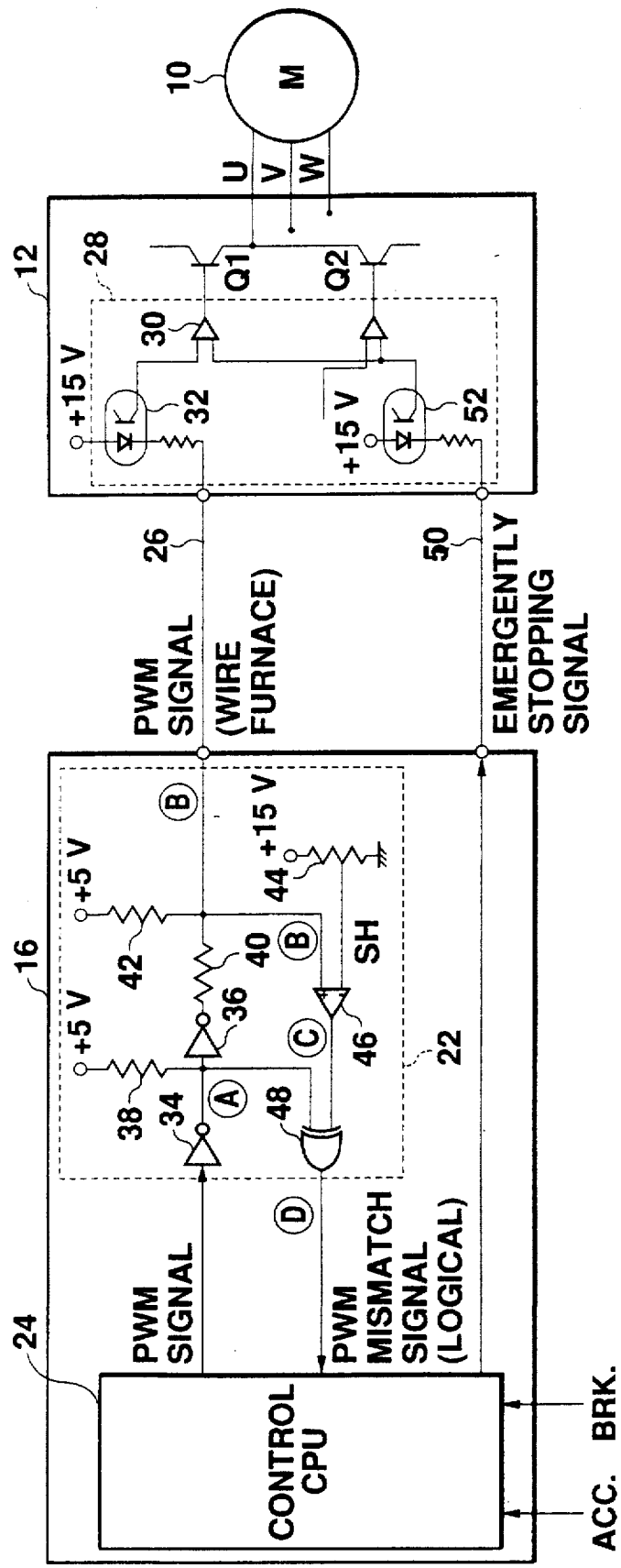
FIG. 2 is a circuit diagram showing the configuration of a PWM signal output/survey circuit in the system of FIG. 1.

FIG. 2 shows the internal configuration of the ECU 16 in this embodiment, and particularly the configuration of a PWM signal output/survey circuit 22. The ECU 16 includes a control CPU 24 for generating the PWM signals based on the accelerator signal or the like as described above, and the PWM signal output/survey circuit 22 supplies these PWM signals to the inverter 12 through a PWM signal line 26. The PWM signal line 26 are connected to a predrive circuit 28 built within the inverter 12. The predrive circuit 28 has buffers 30 and 54 which are provided to correspond to the respective switching elements constituting the inverter 12 and photocouplers 32 and 52 which connect the corresponding PWM signal line 26 and the corresponding buffers 30 and 54 while electrically insulating them from each other. In FIG. 2, the photocouplers 32 and 52 are connected to a +15V power supply. To simplify the illustration, this drawing shows only the circuit which is related to the arm on the source side of the phase U (e.g., there are corresponding circuits for the V and W phases).

The PWM signal output/survey circuit 22 includes two NOT gates 34, 36, a pull-up resistor 38 for pulling up an output from NOT gate 34 to a +5V power source, an output resistor 40 provided at the output stage of the NOT gate 36, a pull-up resistor 42 pulling an output from the NOT gate 36 to +5V power supply, a shunt resistor 44 which produces a threshold voltage SH (e.g., +7V) by dividing the voltage of a +15V power supply, a comparator 46 which compares the electric potential at the connection point of the resistor 40 and the resistor 42 with the threshold voltage SH, and an exclusive OR gate (EOR) 48 which determines an exclusive OR of an output from the comparator 46 and an output from the NOT gate 34 and generates a PWM mismatch signal (logical). The control CPU 24 supplies the PWM signal to the NOT gate 34, and the connection point of the resistor 40 and the resistor 42 is connected to the (corresponding) output PWM signal line 26. When prescribed conditions are met, the control CPU 24 outputs an emergency stopping signal through an emergency stopping signal line 50, which is connected to a photocoupler 52 in the predrive circuit 28. The photocoupler 52 is connected to a +15V power supply and to a respective buffer 54.

Figure 3:
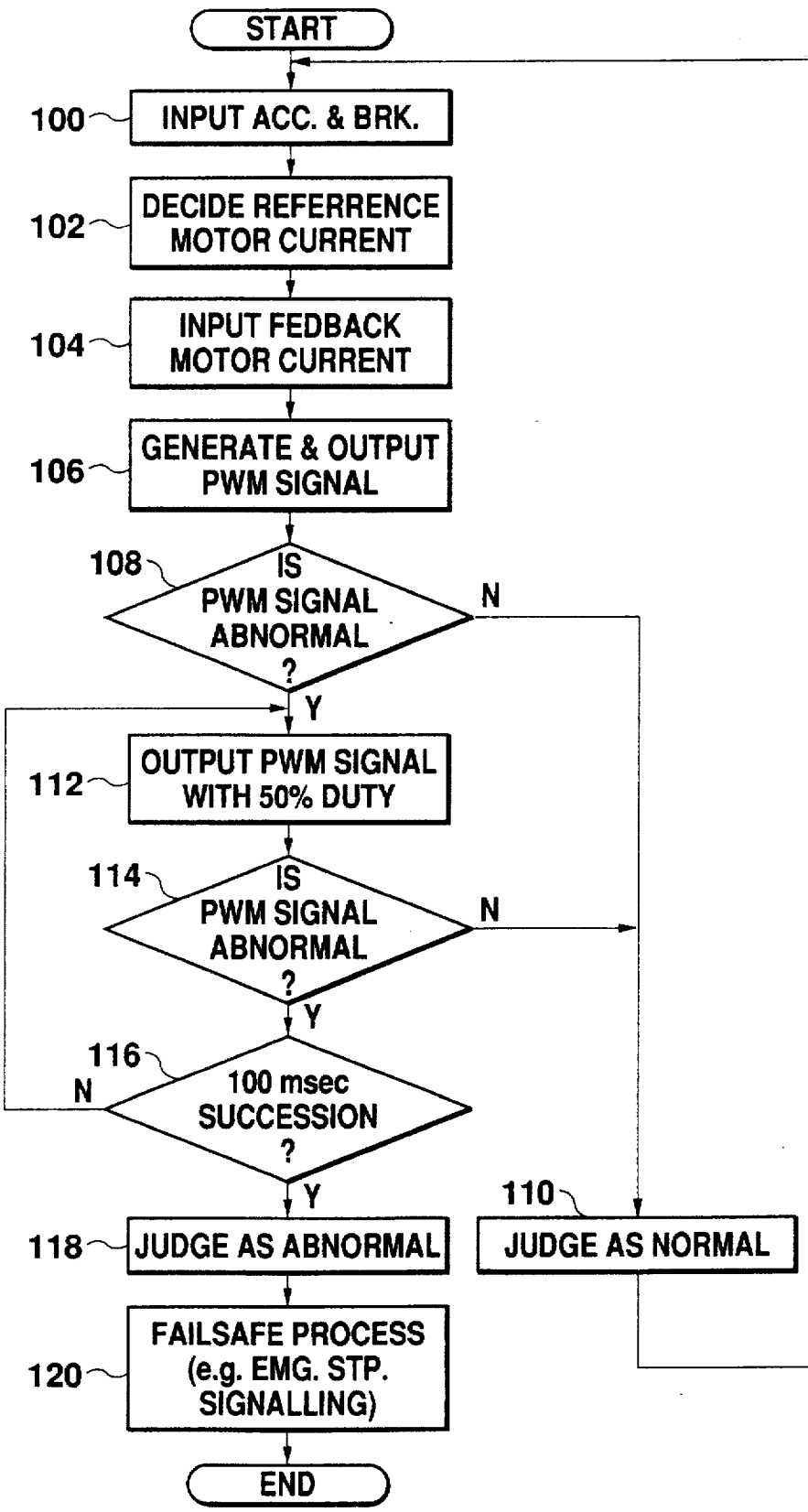
FIG. 3 is a flowchart showing the operation of a control CPU 24 according to the present invention.

FIG. 3 shows a flowchart of operations of the control CPU 24. In FIG. 3, the control CPU 24 first receives either an accelerator signal or a brake signal (step 100), and, based on the received signals, computes reference currents with respect to the motor 10 (step 102). The control CPU 24 receives a feedback current from the inverter 12 (step 104) and generates the PWM signals based on the computed reference currents and the feedback motor currents (step 106). The generated PWM signals are output to the corresponding PWM signal lines 26 by the PWM signal output/survey circuit 22. When the PWM signal lines 26 and the predrive circuit 28 are all normal, the respective switching elements Q1 through Q6 are switched in response to the corresponding PWM signals, and currents according to the accelerator and other signals flow through the motor 10.

Based on the potential of the output terminal D of the EOR gate 48 in FIG. 2, namely the electric potential of the PWM mismatch signal (logical), the control CPU 24 determines whether the PWM signal lines 26 and the predrive circuit 28 are normal (step 108). Specifically, when the indicated electric potential of output terminal A of the NOT gate 34 is high when the electric potentials at one end B of the PWM signal line 26, at the output end C of the comparator 46, and at the output end D of the EOR 48 are as shown in Table 1, and when the output potential at A is low, electric potentials at B, C and D are as shown in Table 2.

TABLE 1

Signal Levels With Electric Potential at Point A = High

| | | | Power short-circuited *1 | |
| Point | Normal | PWM signal Line Broken | + side *1 | GND side *1 |
| --- | --- | --- | --- | --- |
| B | Low | Low | Supply Potential *2 | Low |
| C | Low | Low | High | Low |
| D | High | High | Low | High |

TABLE 2

Signal Levels with Electric Potential at Point A = Low

| | | PWM signal | Power short-circuited *1 | |
| Point | Normal | Line Broken | + side *1 | GND side *1 |
| --- | --- | --- | --- | --- |
| B | Source potential *2 | BCU source potential *2 | Source potential *2 | Low |
| C | High | Low | High | Low |
| D | High | Low | High | Low |

Therefore, when the PWM signal lines 26 and the predrive circuit 28 are normal, the PWM mismatch signal (logical) always has a high electric potential, but when one of the PWM signal lines 26 is broken or short-circuited with a ground, (corresponding) the PWM mismatch signal (logical) has a low electric potential if the point A has a low potential. And, when one of the PWM signals line 26 is short-circuited with the +15 V power supply through the predrive circuit 28, the PWM mismatch signal (logical) has a low potential if point A has a high electric potential. Based on the above logic, the control CPU 24 detects a fault in the respective PWM signal lines 26 and the predrive circuit 28 in step 108. If a fault is not detected in step 108, the control CPU 24 determines that there is no fail (step 110) and repeatedly performs steps 100 to 106.

When a fault is detected in step 108, the control CPU 24 generates a PWM signal line 26 having a duty ratio of 50% instead of the PWM signal produced according to the accelerator and other signals (step 112). Specifically, when the PWM signal is being output according to the accelerator and other signals, the duty ratio becomes a value very close to 0% or 100% if, for example, the motor 10 has a very low rotation speed. Therefore, the detection operation in step 108 cannot always be accurately carried out. In step 12, the duty ratio is set at 50%, so that both the state that point A has a high electric potential and the state that point A has a low electric potential are forcedly set for a relatively long time suitable for accurately detecting a fault. The duty cycle is not strictly required to be 50% but may be set to any level so that the period in which the point A has a high or low level is sufficient to accurately detect a fault. Thus, in the state that the PWM signal with the duty ratio forcedly set to something like 50% is being output (step 112), the control CPU 24 determines the presence or absence of a fault in the PWM signal line 26 in question or the predrive circuit 28 (step 114) by the same logic as used in step 108, and if no fault is detected, step 114 is advanced to step 110 in the same way as when no fault was found in step 108.

If a fault is also detected in step 114, the control CPU 24 repeats steps 112 and 114 until a certain time, e.g., 100 msec, lapses after the first detection of a fault in step 108 (step 116). Specifically, since it is possible that the PWM signal is instantaneously misjudged as a fault because of a transmission delay or noise, a check is carried out over a prescribed time to eliminate such misjudgments. The prescribed time is required to be short, so that the vehicle drivers do not find or feel this time as unacceptable. If a fault is still detected, even after the lapse of a prescribed time in step 116, the control CPU 24 determines that a fault has occurred in the PWM signal line 26 in question or the predrive circuit 28 (step 118), and performs a process to deal with this condition (step 120). For example, the control CPU 24 issues a signal through the emergency stopping signal line 50 to supply the emergency stopping signal to the buffers 30 and 54 provided to correspond with the respective switching elements of the inverter 12, thereby forcibly turning off the respective switching elements. Thus, the power supply from the battery 14 to the motor 10 through the inverter 12 is stopped.

As described above, in case of a fault in the PWM signal line 26 or the predrive circuit 28, the switching operation is stopped according to the present invention. Specifically, since the PWM signal is not continuously output for a long time in case of a fault such as breakage of the PWM signal line 26, there is provided a device which can detect such a fault quicker than prior art, according to the present invention. The PWM signal having a duty ratio set to 50% in step 112 is also output to recheck the fault, so that a detection error can be prevented from occurring. Another fault check is made after the lapse of a prescribed time in step 116 to provide a more reliable fault check.

Though in the above embodiment the fault in the PWM signal line 26 is not discriminated from a fault in the predrive circuit 28, they can be discriminated in accordance with the logic shown in Table 1 and Table 2. Accordingly, the embodiment can be modified so that the vehicle driver can be informed with an occurrence of a fault in a PWM signal line 26 or the predrive circuit 28. In addition, the "breaking of wire" and the "short circuit to ground" can be distinguished by disposing a plurality of the comparator 46, the resistor 44, and the EOR gate 48 in parallel to judge the potential at point B for the threshold value by different SHs.

As is apparent from the configuration of the PWM signal output/survey circuit 22 shown in FIG. 2 and the judging logic shown in Tables 1 and 2, it is not necessary to detect each phase current of the motor 10 in order to perform the fault check procedure according to the invention. Therefore, by combining the invention with the control logic for controlling the inverter 12 without detecting each phase current of the motor 10, current sensors for detecting phase currents of the motor 10 can be omitted. The above description has been made in connection with the adoption to electric vehicles, but the invention is not restricted to the described use. The invention can be applied to switching elements other than those which configure the inverter 12. The invention can also be applied to switching signals other than the PWM signal. In addition, the invention can be used together with the circuit disclosed in Japanese Utility Model Laid-Open Publication No. Sho 63-146488.

While there have been described what are at present considered to be preferred embodiments of the invention, it is to be understood that various modifications may be made thereto, and it is intended that the appended claims cover all such modifications as fall within the true spirit and scope of the invention.

What is claimed is:

1. A fail check device provided between switching elements and a control device producing switching signals, the fail check device comprising:

output signal detection gates coupled between said control device and said switching elements for receiving the switching signals from said control device and for applying the received switching signals to said switching elements via switching signal lines, and fault detection gates coupled to said output signal detection gates for detecting, based on the switching signals received by said output signal detection gates and the switching signals applied by said output signal detection gates, the possibility of occurrence of a fault relating to said switching signal lines, the fail check device thereby detecting the possibility of a fault relating to said switching signal lines while supplying said switching signals to said switching elements through said switching signal lines.

2. The fail check device according to claim 1, wherein the control device is configured to set both on and off periods of said switching signals to a prescribed duration or longer when said possibility of a fault is detected, and to perform the detection of said possibility of a fault with respect to said on and off periods.

3. The fail check device according to claim 1, wherein said control device determines that said fault relating to said switching signal lines has actually occurred when said possibility of a fault has been detected over a prescribed duration or longer.

4. The fail check device according to claim 1, wherein said control device is configured to stop the operation of said switching elements by supplying an emergency stopping signal to said switching elements through an emergency stopping signal line independent of said switching signal lines upon detecting a fault or the possibility of a fault.

* * * * *